(12) United States Patent
Ambastha et al.

(10) Patent No.: US 8,850,425 B1
(45) Date of Patent: Sep. 30, 2014

(54) METHOD AND SYSTEM FOR DISPLAYING CONFIGURATION TEST RESULTS BY LEVERAGED DATA PROTECTION SOFTWARE

(75) Inventors: Nikhil Ambastha, Bangalore (IN); Suman Tokuri, Bangalore (IN); Aditya Kapoor, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 23 days.

(21) Appl. No.: 13/595,727

(22) Filed: Aug. 27, 2012

(51) Int. Cl.
*G06F 9/445* (2006.01)
(52) U.S. Cl.
USPC .......................................... 717/178; 717/168
(58) Field of Classification Search
USPC ................................................ 717/124–160
See application file for complete search history.

(56) References Cited

U.S. PATENT DOCUMENTS 7,275,235 B2 * 9/2007 Molinari et al. .............. 717/100

* cited by examiner

*Primary Examiner* — Chuck Kendall
(74) *Attorney, Agent, or Firm* — Dergosits & Noah LLP; Todd A. Noah

(57) ABSTRACT

Displaying configuration test results by leveraged data protection software is described. A memory location is read where a display file is stored for a software installer. A configuration checker is executed for the computer. Results are read from executing the configuration checker. The results are written to the memory location. A leveraged software creation tool is prompted to display the display file via an output device. The leveraged software creation tool lacks the capability to dynamically load the display file.

20 Claims, 3 Drawing Sheets

METHOD AND SYSTEM FOR DISPLAYING CONFIGURATION TEST RESULTS BY LEVERAGED DATA PROTECTION SOFTWARE

BACKGROUND

EMC Corporation's NetWorker® is a suite of enterprise level data protection software that unifies and automates backup to tape, disk-based, and flash-based storage media across physical and virtual environments for granular and disaster recovery. Cross-platform support is provided for many environments, including Microsoft Windows®. A central NetWorker® server manages a data zone that contains backup clients and NetWorker® storage nodes that access the backup media. The NetWorker® management console software provides a user interface for functions such as client configuration, policy settings, schedules, monitoring, reports, and daily operations for deduplicated and non-deduplicated backups. The core NetWorker® software backs up client file systems and operating system environment. Add-on database and application modules provide backup services for products such as Microsoft® Exchange Server. Client backup data can be sent to a remote NetWorker® storage node or stored on a locally attached device by the use of a dedicated storage node. EMC Corporation's Networker® modules for Microsoft® applications supports Microsoft® products such as Microsoft® Exchange, Sharepoint, and Hyper-V virtual servers. Networker® modules for Microsoft® applications leverages Installshield®, a software tool for creating installers or software packages, to build Networker® modules for Microsoft® applications, such as installers or software packages. The resulting installers or software packages are easily built using the popular Installshield® tool, and are preconfigured to protect the Microsoft® application data using Networker®

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
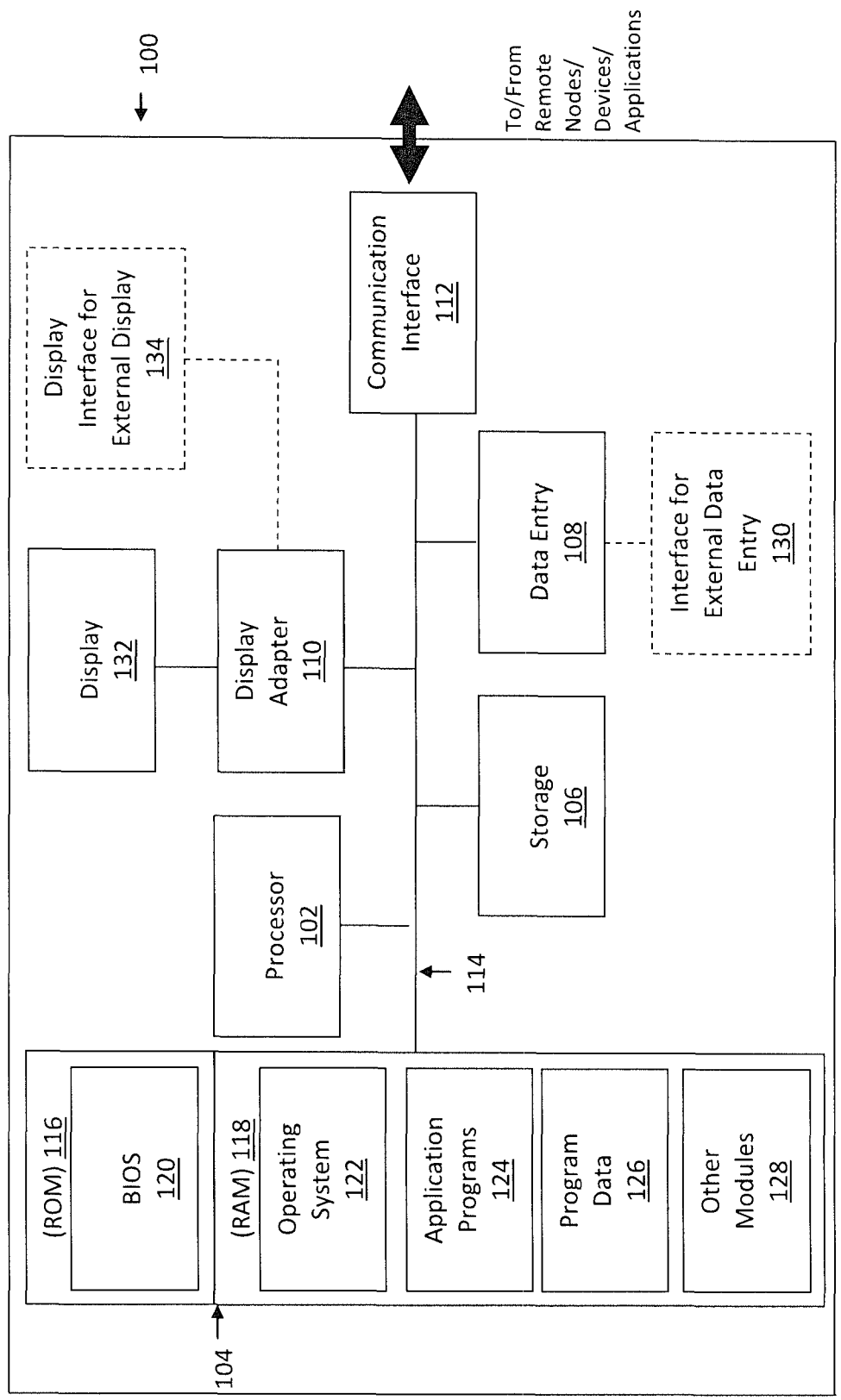
FIG. 1 is a block diagram illustrating an example hardware device in which the subject matter may be implemented.

Some basic environmental pre-requisites must be checked before the installation of Networker® modules for Microsoft® applications on a host computer. Config Checker is a tool that executes configuration tests for Networker® modules for Microsoft® on the system on which Networker® modules for Microsoft® applications is being installed. Config Checker can auto detect a number of possible environmental/configuration issues which can lead to failures of backup and/or recovery operations. Config Checker is integrated into the installer for Networker® modules for Microsoft® applications so that a user can request configuration tests using the same installer which is used to install Networker® modules for Microsoft® applications.

However, Installshield® does not support any suitable way of presenting configuration test results. The only user control that Installshield® supports for displaying user content from a software installer is by displaying a Rich Text Format (RTF) file which is precompiled at the time the installer is built. At runtime, after the installer is built, Installshield® does not support dynamically loading and displaying the Rich Text Format file or support scrollable text control. Scrollable text control displays a long string of text, which cannot fit completely on a display screen, by providing scroll bars that enable users to scroll up and down and/or side to side through the full text. Instead of dynamically loading and displaying the Rich Text Format file in scrollable text control, Installshield® only displays a static Rich Text Format file, such as a license agreement. Installshield® also does not support refreshing a display of a Rich Text Format file. In contrast, a user who executed Config Checker would want to scroll through configuration test results, to rerun failed test cases, and to view refreshed results.

Embodiments herein enable displaying configuration test results by leveraged data protection software. After being loaded into memory, a software installer reads the memory location where the software installer's display file is stored to determine the location where Installshield® can read a static file to be displayed. Once this memory location has been determined, the software installer executes a configuration checker for the host computer. When the configuration checker finishes running configuration tests, the software installer reads the results from executing the configuration tests. Since the software installer needs to use Installshield® to output these configuration test results directly, the software installer writes these results to the memory location where Installshield® can read a static file to be displayed, thereby overwriting the static display file previously stored in memory. Then the software installer prompts Installshield®, which displays the overwritten display file via an output device, even though Installshield® lacks the capability to dynamically load any display files.

Furthermore, if the configuration test results include any failed configuration tests, the software installer displays an option to rerun any failed configuration tests via the output device, such as by displaying a "rerun" button on the Installshield® screen. If a user selects to rerun any failed configuration tests, the software installer executes the configuration checker based on the failed configuration tests. Similar to the first time that the software installer executed the configuration checker, the software installer reads the results from executing the configuration checker based on the failed configuration tests, writes the results of rerunning the failed configuration tests to the memory location where the static display file was initially stored, and prompts Installshield® to once again display the overwritten display file via an output device. Embodiments herein enable users to configure their environments properly and pinpoint issues beforehand. Users view the configuration test results via Installshield® screens, from where the users can easily identify and correct an environmental issue, and rerun the configuration tests to verify that the environmental issue has been corrected.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context. In an embodiment, the computer system 100 includes one or more methods for displaying configuration test results by leveraged data protection software.

Installshield® does not support any suitable way of presenting configuration test results. Instead of dynamically loading and displaying a Rich Text Format file for configuration test results in scrollable text control, Installshield® only displays a static Rich Text Format file, such as a license agreement. Installshield® also does not support refreshing a display of a Rich Text Format file. In contrast, a user who executed a configuration checker would want to scroll through configuration test results, to rerun failed test cases, and to view refreshed results.

Embodiments herein enable users to configure their environments properly and pinpoint issues beforehand. Users view the configuration test results via Installshield® screens, from where the users can easily identify and correct an environmental issue, and rerun the configuration tests to verify that the environmental issue has been corrected.

Figure 2:
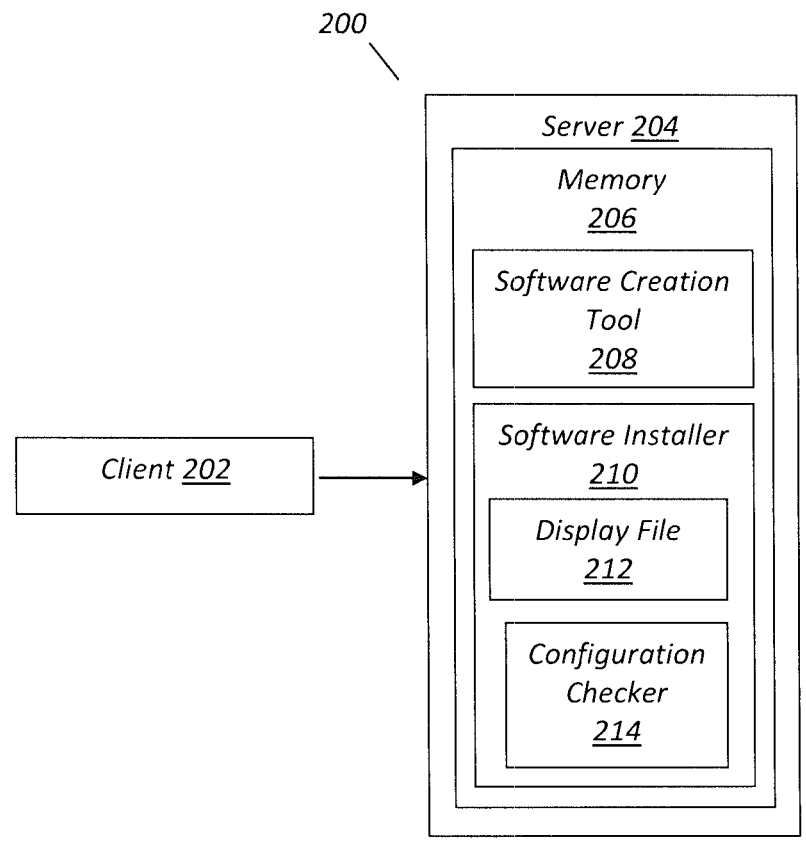
FIG. 2 illustrates a block diagram of an example system for displaying configuration test results by leveraged data protection software, under an embodiment.

FIG. 2 illustrates a block diagram of a system that implements displaying configuration test results by leveraged data protection software, under an embodiment. As shown in FIG. 2, system 200 may illustrate a cloud computing environment in which data, applications, services, and other resources are stored and delivered through shared data-centers and appear as a single point of access for the users. The system 200 may also represent any other type of distributed computer network environment in which servers control the storage and distribution of resources and services for different client users.

In an embodiment, the system 200 represents a cloud computing system that includes a client 202 and a server 204 that is provided by a hosting company. Although FIG. 2 depicts the system 200 with one client 202 and one server 204, the system 200 may include any number of clients 202 and servers 204. The client 202 and the server 204 may each be substantially similar to the system 100 depicted in FIG. 1. The server 204 includes memory 206, which stores software creation tool 208 and software installer 210. Software creation tool 208 may be Installshield® software creation tool, and software installer 210 may be a software installer used for installing Networker® modules for Microsoft® applications. Software installer 210 includes display file 212 and configuration checker 214. The configuration checker 214 for Networker® modules for Microsoft® applications may be integrated in the software installer 210 for installing Networker® modules for Microsoft® applications to enable a user to request configuration tests using the same installer which is used to install Networker® modules for Microsoft® applications, thereby reducing overhead.

After being loaded into the memory 206, the software installer 210 reads the memory location where the software installer's display file 212 is stored to determine the location where the Installshield® software creation tool 208 can read a static file to be displayed. The display file 212 for the software installer 210 may be created as a blank display file 212 in a scrollable text control, and the display file 212 may be a rich text format file. The reason that the display file 212 may be created as a blank "AAA.rtf" display file 212 is because any content of the display file 212 will be overwritten with configuration test results.

Once the memory location of the display file 212 has been determined, the software installer 210 executes the configuration checker 214 for the server 204. Executing the configuration checker 214 may be based on user-selected configuration tests.

When the configuration checker 214 finishes running configuration tests, the software installer 210 reads the results from executing the configuration checker 214. The software installer 210 may write the configuration test results into a temporary "BBB.rtf" file.

Since the software installer 210 needs to use the Installshield® software creation tool 208 to output these configuration test results directly to the client 202, the software installer 210 writes these results to the display file 212 at the memory location where the Installshield® software creation tool 208 can read a static file to be displayed, thereby overwriting the static display file 212 previously stored in the memory 206. Then the software installer 210 prompts the Installshield® software creation tool 208, which displays the overwritten display file 212 via the client 202, even though the Installshield® software creation tool 208 lacks the capability to dynamically load any display files.

Furthermore, if the configuration test results include any failed configuration tests, the software installer 210 displays an option to rerun any failed configuration tests via the output device. For example, the software installer 210 displays a "rerun" button on the Installshield® screen sent to the client 202. If a user selects to rerun any failed configuration tests, the software installer 210 executes the configuration checker 214 based on the failed configuration tests specified to be rerun by the user.

Similar to the first time that the software installer 210 executed the configuration checker 214, the software installer 210 reads the results from executing the configuration checker 214 based on the failed configuration tests. For example, the software installer 210 may write the rerun configuration test results into a temporary "CCC.rtf" file. Then the software installer 210 writes the results of rerunning the failed configuration tests from temporary "CCC.rtf" file to the memory location where the static display file 212 was initially stored, and prompts the Installshield® software creation tool 208 to once again display the overwritten display file 212 via the client 202.

The software installer 210 may simulate scrollable text control by creating a top text results display file and a bottom text results display file; and alternating the writing of the top text results display file and the bottom text results display file to the memory location in response to receiving a user request to scroll the text displayed. For example, the configuration test results may include the results of 19 configuration tests, and the Installshield® screen may have sufficient display space to display the results of only 10 configuration tests at one time. Therefore, the software installer 210 may write the results of the first 10 configuration test into a temporary "B1.rtf" file, write the results of the last 10 results of configuration test into a temporary "B2.rtf" file, write the results of the first 10 configuration test to the memory location for the display file 212, and prompt the Installshield® software creation tool 208 to display the display file 212. Consequently, the Installshield® software creation tool 208 displays the results of the first 10 configuration test to the client 202 via an Installshield® screen. If the user wants to view the results of the last 10 configuration tests, the user selects the scroll bar displayed by the software installer 210, a scrollbar which Installshield® does not directly support. In response to the user selecting the scroll bar, the software installer 210 write the results of the last 10 configuration test, stored in the temporary "B2.rtf" file, to the memory location for the display file 212, and prompt the Installshield® software creation tool 208 to display the display file 212, thereby simulating scrollable text control. Then the Installshield® software creation tool 208 displays the last 10 results of the configuration test to the client 202 via an Installshield® screen. If the user wants to return to the results of the first 10 configuration tests, the user selects the scroll bar again, the software installer 210 write the results of the first 10 configuration test, stored in the temporary "B1.rtf" file, to the memory location for the display file 212, and the Installshield® software creation tool 208 displays the first 10 results of the configuration test to the client 202 via an Installshield® screen, thereby simulating scrollable text control. If necessary, the software installer 210 may divide the results into any number of temporary files to simulate scrollable text control, based on the number of times the text displayed by the Installshield® screen must be scrolled to display all of the results.

Embodiments herein enable users to configure their environments properly and pinpoint issues beforehand. Users view the configuration test results via Installshield® screens, from where the users can easily identify and correct an environmental issue, and rerun the configuration tests to verify that the environmental issue has been corrected.

Figure 3:
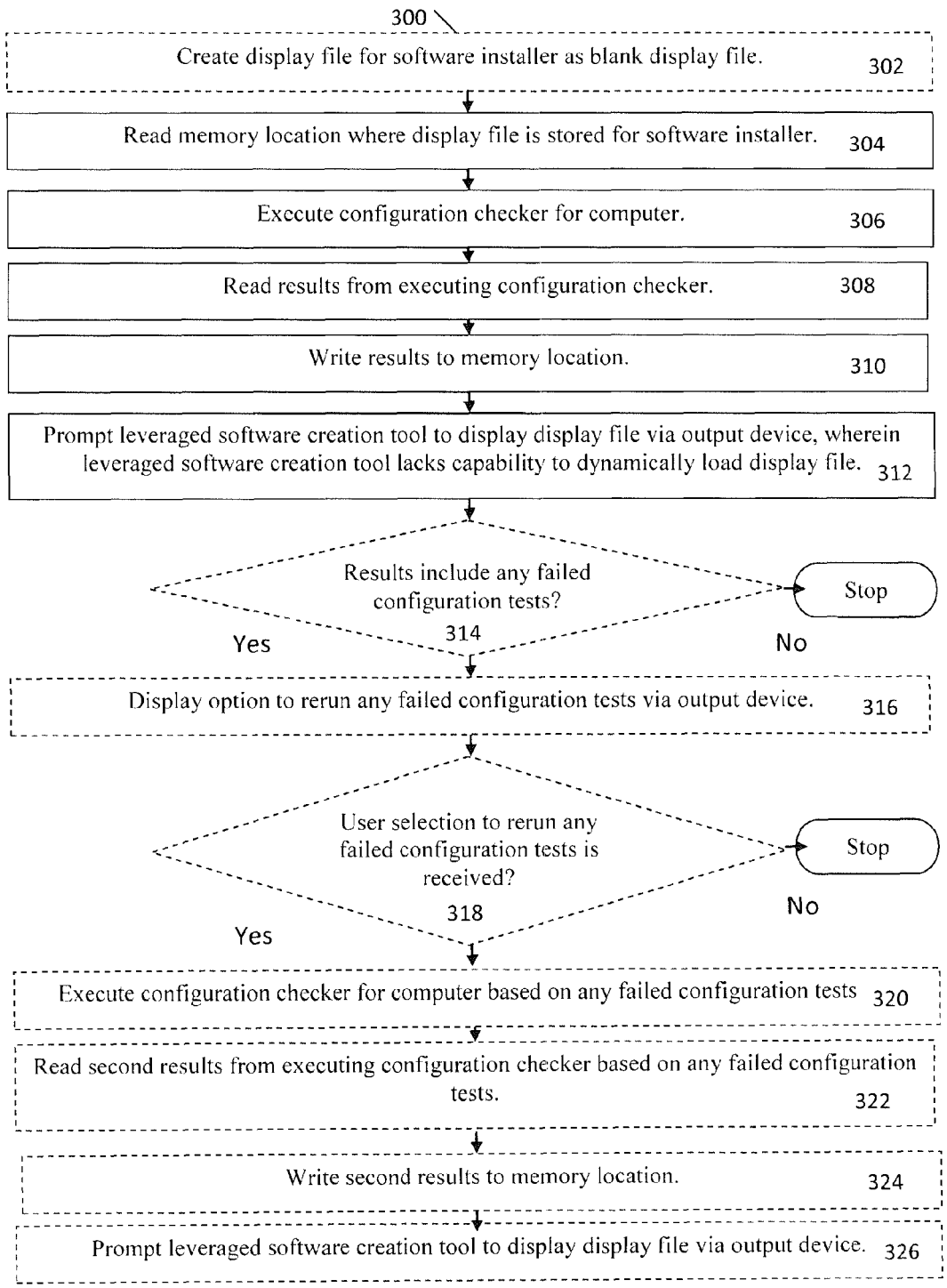
FIG. 3 is a flowchart that illustrates a method of displaying configuration test results by leveraged data protection software, under an embodiment.

FIG. 3 is a flowchart that illustrates a method of displaying configuration test results by leveraged data protection software. Flowchart 300 illustrates method acts illustrated as flowchart blocks for certain steps involved in and between the client 202 and the server 204 of FIG. 2.

A display file for a software installer is optionally created as blank display file, act 302. For example, the software installer 210 creates the display file 212 as a blank "AAA.rtf" display file 212 with scrollable text control.

A memory location where a display file is stored for a software installer is read, act 304. For example, the software installer 210 reads the memory location where the blank "AAA.rtf" display file 212 is stored.

A configuration checker is executed for computer, act 306. For example, the software installer 210 executes the configuration checker 214 for the server 204 based on user selected configuration tests.

Results are read from executing a configuration checker, act 308. For example, the software installer 210 reads the results from executing the configuration checker 214, and writes these results to a temporary "BBB.rtf" file.

Results are written to a memory location, act 310. For example, the software installer 210 writes the results from executing the configuration checker 214 based on the user-selected configuration tests, from the temporary "BBB.rtf" file, to the memory location for the blank "AAA.rtf" display file 212.

A leveraged software creation tool is prompted to display a display file via an output device, wherein the leveraged software creation tool lacks a capability to dynamically load a display file, act 312. For example, the software installer 210 prompts the Installshield® software creation tool 208 to display the display file 212, which includes the results from executing the configuration checker 214 stored in the temporary "BBB.rtf" file, via the client 202.

A determination is made whether the results include any failed configuration tests, act 314. For example, the software installer 210 determines whether the results from executing the configuration checker 214 based on the user-selected configuration tests include any failed configuration tests. If the results from executing the configuration checker 214 include any failed configuration tests, the flowchart 300 may continue to act 316. If the results from executing the configuration checker 214 do not include any failed configuration tests, the flowchart 300 may terminate.

An option to rerun any failed configuration tests is displayed via an output device, act 316. For example, the software installer 210 displays an option to rerun any failed configuration tests via the client 202 as a "rerun" button on an Installshield® screen.

A determination is made whether a user selection to rerun any failed configuration tests is received, act 318. For example, the software installer 210 determines whether a user selection to rerun any failed configuration tests is received via the client 202. If a user selection to rerun any failed configuration tests is received, the flowchart 300 continues to act 320. If a user selection to rerun any failed configuration tests is not received, the flowchart 300 may terminate.

A configuration checker is executed for a computer based on any failed configuration tests, act 320. For example, the software installer 210 executes the configuration checker 214 for the server 204 based on any failed configuration tests selected by the user.

Second results from executing a configuration checker based on any failed configuration tests are read, act 322. For example, the software installer 210 reads the results from executing the configuration checker 214 based on any user selected failed configuration tests, and writes these results into a temporary "CCC.rtf" file.

Second results are written to a memory location, act 324. For example, the software installer 210 writes the results from executing the configuration checker 214 based on any user-selected failed configuration tests from the temporary "CCC.rtf" file to the memory location for the previously overwritten display file 212.

A leveraged software creation tool is prompted to display a display file via an output device, act 326. For example, the software installer 210 prompts the Installshield® software creation tool 208 to display the display file 212 which includes the results from executing the configuration checker 214 stored in the temporary "CCC.rtf" file, via the client 202.

Although FIG. 3 depicts the acts 302-326 occurring in a specific order, the acts 302-326 may occur in another order. Embodiments herein enable users to configure their environments properly and pinpoint issues beforehand. Users view the configuration test results via Installshield® screens, from where the users can easily identify and correct an environmental issue, and rerun the configuration tests to verify that the environmental issue has been corrected.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for displaying configuration test results by leveraged data protection software, the system comprising:
 a processor-based application executed on a computer and configured to:
 read a memory location where a display file is stored for a software installer;
 execute a configuration checker for the computer;
 read results from executing the configuration checker;
 write the results to the memory location; and
 prompt a leveraged software creation tool to display the display file via an output device, wherein the leveraged software creation tool lacks the capability to dynamically load the display file.

2. The system of claim 1, wherein the processor-based application is further configured to create the display file for the software installer as a blank display file in a scrollable text control.

3. The system of claim 1, wherein the display file is a rich text format file.

4. The system of claim 1 wherein executing the configuration checker is based on user selected configuration tests.

5. The system of claim 1 wherein the processor-based application is further configured to: determine whether the results comprise any failed configuration tests; and
 display an option to rerun any failed configuration tests via the output device in response to a determination that the results comprise any failed configuration tests.

6. The system of claim 5, wherein the processor-based application is further configured to:
 determine whether a user selection to rerun any failed configuration tests is received;
 execute the configuration checker for the computer based on any failed configuration tests in response to a determination that the user selection to rerun any failed configuration tests is received;
 read second results from executing the configuration checker based on any failed configuration tests;
 write the second results to the memory location; and
 prompt the leveraged software creation tool to display the display file via an output device.

7. The system of claim 1, wherein the processor-based application is further configured to simulate scrollable text control by:
 creating a first text results display file and a second text results display file; and
 alternating the writing of the first text results display file and the second text results display file to the memory location in response to receiving a user request to scroll text displayed.

8. A computer-implemented method for displaying configuration test results by leveraged data protection software, the method comprising:
 reading a memory location where a display file is stored for a software installer;
 executing a configuration checker for the computer;
 reading results from executing the configuration checker;
 writing the results to the memory location;
 prompting a leveraged software creation tool to display the display file via an output device, wherein the leveraged software creation tool lacks the capability to dynamically load the display file;
 determining whether the results comprise any failed configuration tests;
 displaying an option to rerun any failed configuration tests via the output device in response to a determination that the results comprise any failed configuration tests;
 determining whether a user selection to rerun any failed configuration tests is received;

executing the configuration checker for the computer based on any failed configuration tests in response to a determination that the user selection to rerun any failed configuration tests is received;

reading second results from executing the configuration checker based on any failed configuration tests;

writing the second results to the memory location; and prompting the leveraged software creation tool to display the display file via an output device.

9. The method of claim 8, further comprising creating the display file for the software installer as a blank display file in a scrollable text control.

10. The method of claim 8, wherein the display file is a rich text format file.

11. The method of claim 8, wherein executing the configuration checker is based on user selected configuration tests.

12. The method of claim 8, further comprising simulating scrollable text control by:

creating a first text results display file and a second text results display file; and alternating the writing of the first text results display file and the second text results display file to the memory location in response to receiving a user request to scroll text displayed.

13. A computer program product, comprising a non-transitory computer-readable medium having a computer-readable program code embodied therein, the computer-readable program code adapted to be executed by one or more processors to implement a method for displaying configuration test results by leveraged data protection software, the method comprising:

reading a memory location where a display file is stored for a software installer;

executing a configuration checker for the computer;

reading results from executing the configuration checker;

writing the results to the memory location; and prompting a leveraged software creation tool to display the display file via an output device, wherein the leveraged software creation tool lacks the capability to dynamically load the display file.

14. The computer program product of claim 13, the method further comprising creating the display file for the software installer as a blank display file in a scrollable text control.

15. The computer program product of claim 13, wherein the display file is a rich text format file.

16. The computer program product of claim 13, wherein executing the configuration checker is based on user selected configuration tests.

17. The computer program product of claim 13, the method further comprising:

determining whether the results comprise any failed configuration tests; and displaying an option to rerun any failed configuration tests via the output device in response to a determination that the results comprise any failed configuration tests.

18. The computer program product of claim 17, the method further comprising:

determining whether a user selection to rerun any failed configuration tests is received;

executing the configuration checker for the computer based on any failed configuration tests in response to a determination that the user selection to rerun any failed configuration tests is received.

reading second results from executing the configuration checker based on any failed configuration tests;

writing the second results to the memory location; and prompting the leveraged software creation tool to display the display file via an output device.

19. The computer program product of claim 13, the method further comprising simulating scrollable text control by:

creating a first text results display file and a second text results display file; and alternating the writing of the first text results display file and the second text results display file to the memory location in response to receiving a user request to scroll text displayed.

20. The computer program product of claim 13, wherein the leveraged software creation tool is an Installshield® software creation tool, the software installer is associated with Networker® modules for Microsoft® applications, and the configuration checker is associated with Networker® modules for Microsoft® applications.

* * * * *